April 12, 1932. E. R. LLEWELLYN 1,853,737
POWER TRANSMITTING MECHANISM FOR LATHES OR THE LIKE
Filed Sept. 27, 1930 3 Sheets-Sheet 2
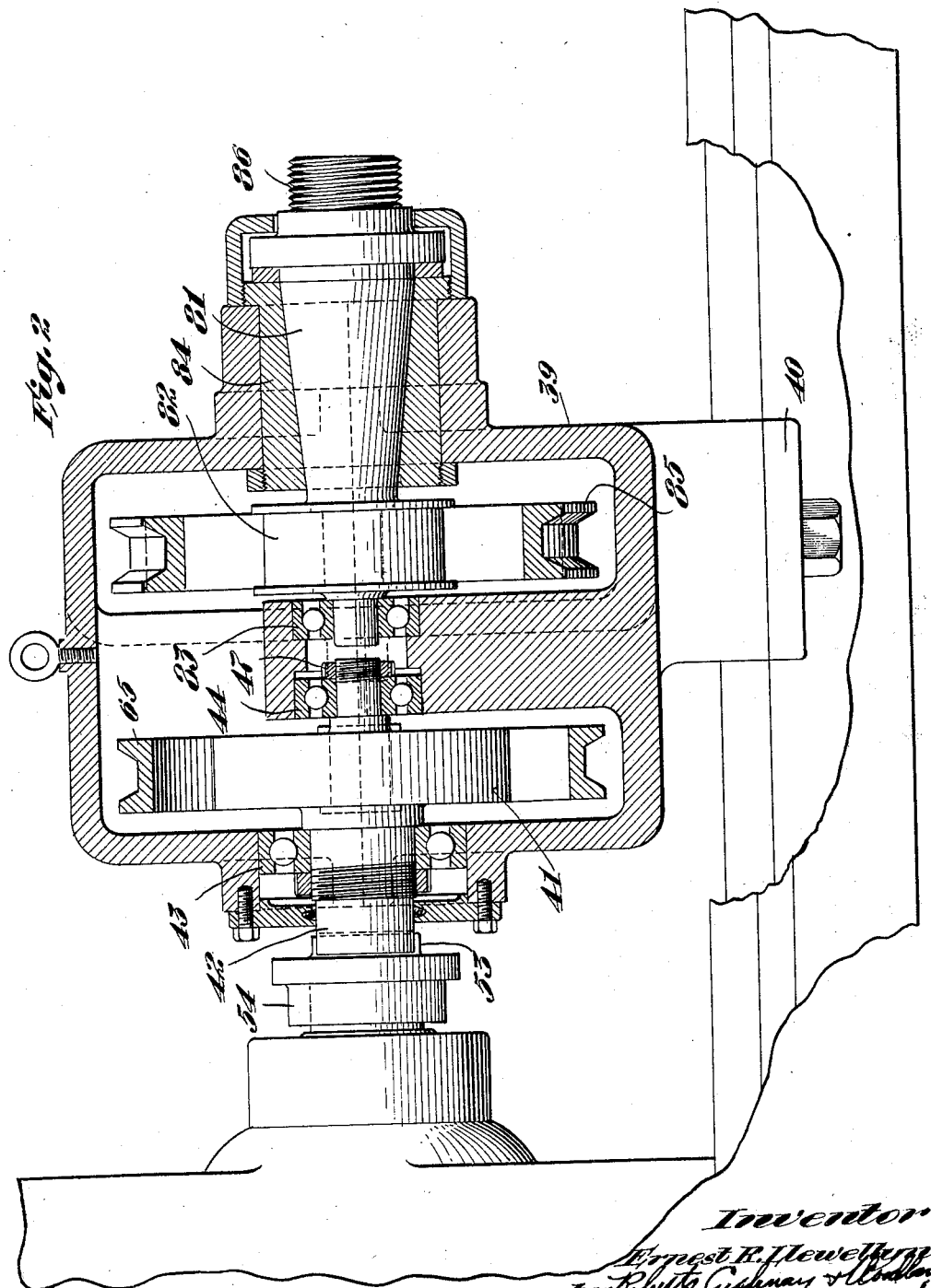

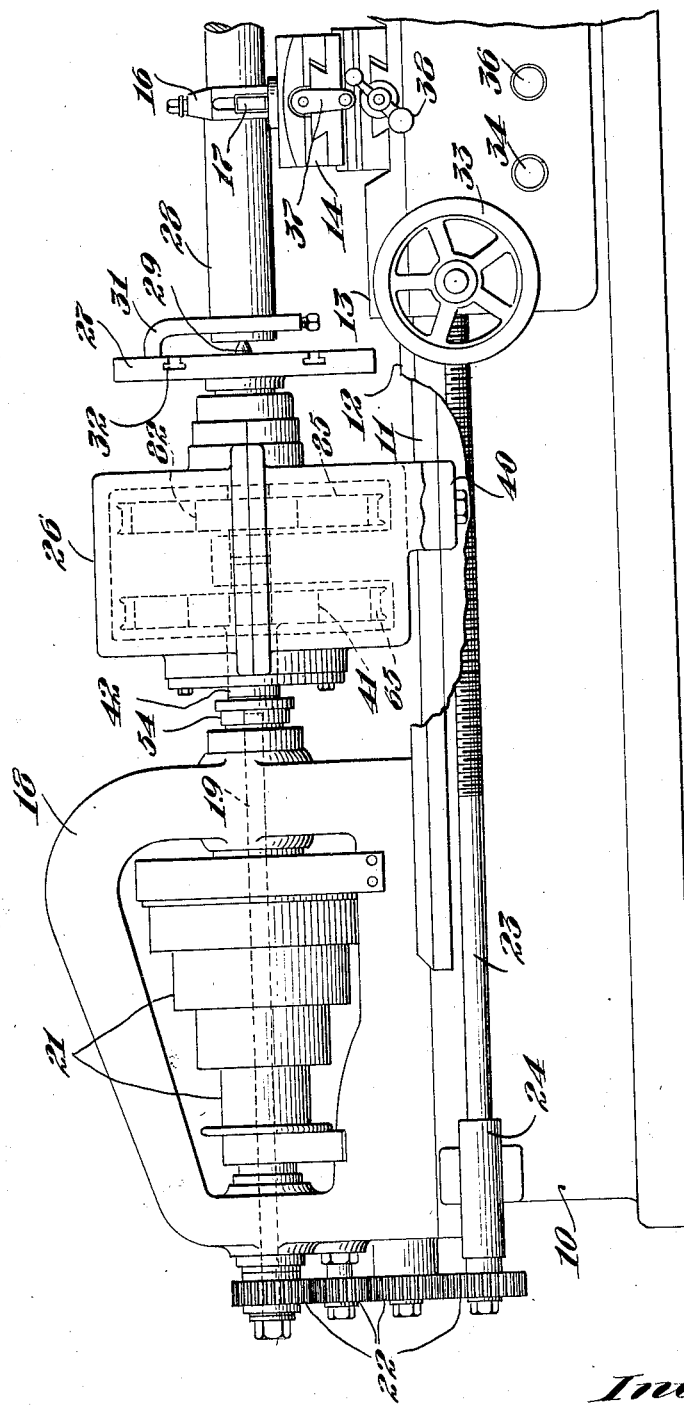

April 12, 1932. E. R. LLEWELLYN 1,853,737
POWER TRANSMITTING MECHANISM FOR LATHES OR THE LIKE
Filed Sept. 27, 1930 3 Sheets-Sheet 3
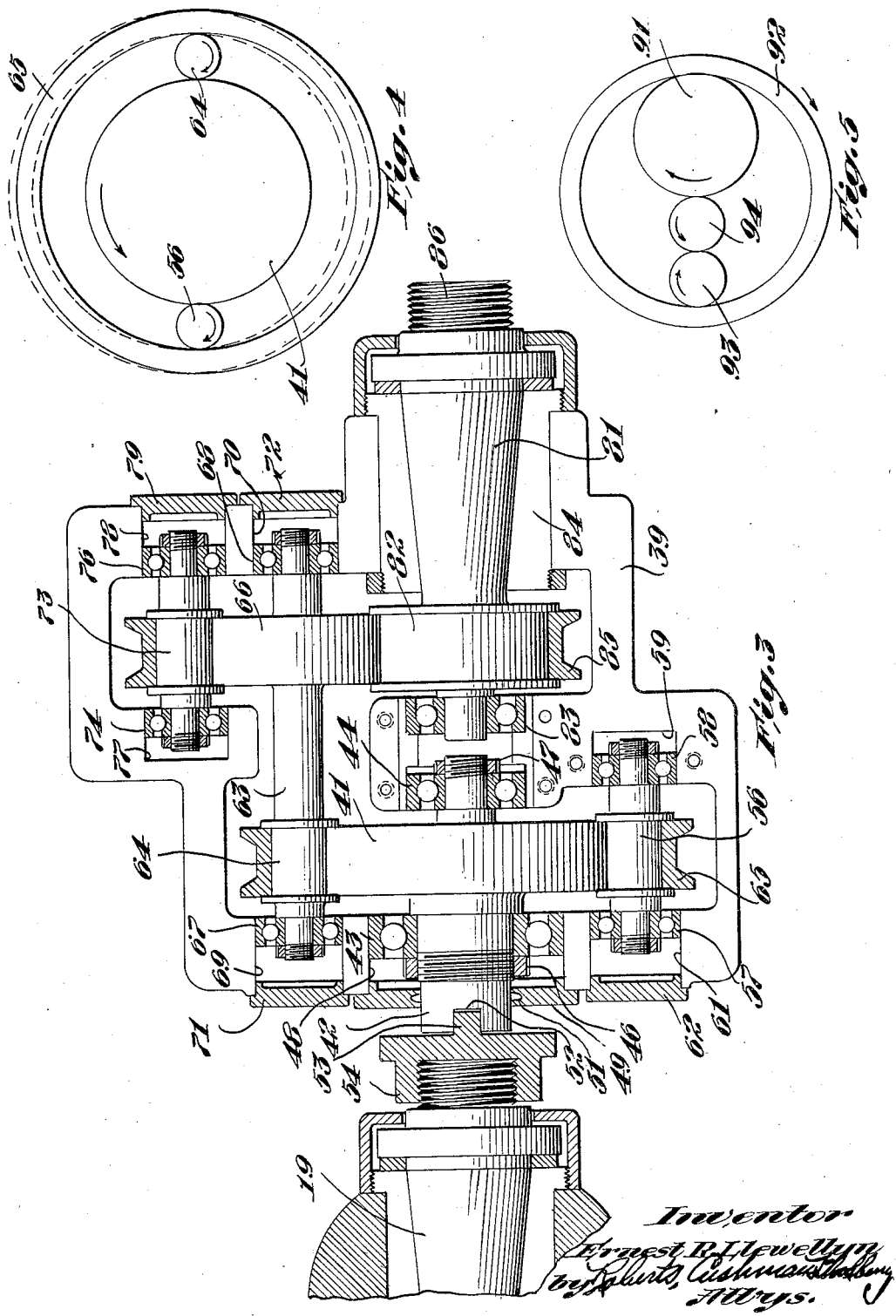

Patented Apr. 12, 1932

1,853,737

UNITED STATES PATENT OFFICE

ERNEST R. LLEWELLYN, OF ARLINGTON, MASSACHUSETTS, ASSIGNOR TO THE HENDEY MACHINE COMPANY, OF TORRINGTON, CONNECTICUT, A CORPORATION OF CONNECTICUT

POWER TRANSMITTING MECHANISM FOR LATHES OR THE LIKE

Application filed September 27, 1930. Serial No. 484,756.

This invention relates to apparatus for performing various machining operations such for example as machines suitable for precision work and/or for work where substantially uniform operating speeds as well as relatively high speeds are desirable. A lathe is representative of machines of this general class. With apparatus of this character even a slight variation in the operating speed may produce quite a noticeable effect on a product, as for instance a variation in the smoothness or in the depth of a cut being made by a lathe.

It is customary to equip machines of this class with gearing, usually of the selective change speed type, for obtaining the desired range of operating speeds. However, the maximum permissible operating speed for a geared unit is about 1200 R. P. M. Above this speed the gears are not only too noisy and unsafe, but also produce excessive chatter marks in the work due to tooth impact at high velocity. For these reasons a detachable unit of the type embodying toothed reduction gearing can not be modified merely by changing the ratios to provide a satisfactory speed increaser unit. It is highly desirable that a machine of this type be capable of operating at much higher speeds and that these speeds be attainable with a detachable speed increaser unit. Such an arrangement greatly increases the utility of a machine by making the higher speeds available through the detachable unit and the normal range of speeds available directly from the machine without the necessity of altering the construction of such a machine. At the present time cutting tools for lathes, such as a tool with a carboloy tip for example, are available which will stand up at speeds at least as high as 3000 R. P. M. Inasmuch as the lathe builders have been unable to produce a geared lathe which will operate satisfactorily at a speed above approximately 1200 R. P. M. the limit set by the selective gearing, it has been impossible to obtain anywhere near the maximum cutting value from such tools and of course the utility and productive capacity of machines of this type have remained limited accordingly.

Some aspects of the present invention relate to means for increasing the operating speeds of machines of the class referred to beyond the range of speeds obtainable with geared units. In other aspects the invention relates to power transmitting mechanism for transmitting power at substantially uniform speeds without objectionable variations during changes of load or during accelerations or decelerations of the particular machine with which this mechanism may be employed. In this aspect the power transmitting means may be embodied in a machine for transmitting power directly from a power shaft or from a prime mover to the work to be treated. In some preferred embodiments, however, the power transmitting mechanism is in the form of detachable unit adapted to be connected to machines of this class for increasing the utility thereof without the necessity of altering the design or present construction.

Objects of the present invention are to improve the efficiency of apparatus of the class described by providing means for increasing the operating speeds thereof beyond the range of speeds obtainable with geared units; to provide apparatus of the class described with means for transmitting or delivering power evenly and smoothly at a substantially uniform rate, either at constant speeds or during changes of speeds as well as under constant or variable loads; to provide a detachable unit embodying power transmitting mechanism of this kind which is also compactly arranged and economical of space; and also to provide an improved unit of this character of rugged, durable and yet sensitive construction capable of responding to slight changes in operating conditions and consisting of a few parts which are relatively simple and inexpensive to manufacture.

In the drawings;

Fig. 1 is a side elevation of a portion of a lathe with parts broken away to show details of the construction;

Fig. 2 is a central vertical section of speed change apparatus shown in Fig. 1;

Fig. 3 is a central horizontal section of the speed change apparatus shown in Figs. 1 and 2; and Figs. 4 and 5 are diagrammatic views of speed change apparatus.

For the purposes of illustration the features of the invention have been shown in the drawings as embodied in a lathe comprising a bed 10 having ways 11 and 12 which slidably support the carriage 13 in the usual manner. A compound tool rest 14 is mounted upon this carriage and carries a tool holder 16 which receives a tool 17. The head stock 18 is mounted on the bed 10 and provides bearings for the spindle 19 which is adapted to be driven by the stepped pulleys 21. The spindle is also connected by suitable gearing 22 to the lead screw 23, the latter being mounted in a bearing 24 carried by the bed and operatively connected to the carriage 13 in the manner well understood in this art.

A speed change mechanism, indicated generally at 26, is detachably connected to the nose of the spindle 19 and carries the usual face plate 27. A piece of stock 28 is also illustrated as mounted on the center 29 and is rotated by means of a dog 31 which engages one of the slots or other openings 32 in the face plate. The carriage 13 is also equipped with a hand wheel 33 for manual feed and with controls 34 and 36 for the usual automatic feeds. The compound tool rest is likewise provided with manually operable handles 37 and 38 for adjusting the position of the tool and is otherwise of the usual construction.

The power transmitting or speed change mechanism 26 is shown more clearly in Figs. 2 and 3 from which it will be seen that this apparatus comprises a casing 39 which provides a frame for supporting the operating parts thereof. This casing is provided with feet, not shown, which are secured on the ways 11 and 12 by a clamping plate 40 attached to the housing and extending under the ways to support this apparatus as indicated in Fig. 1. Within the casing a primary driving roller 41 is rigidly secured to or formed integral with a shaft 42 which is rotatably mounted at either side of the roll, preferably in anti-friction bearings such as ball bearings 43 and 44. This shaft is held in properly spaced relation in these bearings by spacers 46 and 47 threaded thereon. The recess or chamber 48 which receives the larger bearing 43 preferably extends outwardly to the outside of the casing 39 so that this bearing may readily be inserted in its proper position. The chamber 48 is closed by a removable cover 49 which fits over the end of the shaft 42 and carries a felt or other suitable oil retaining ring 51. This end of the shaft 42 is slotted transversely, as indicated at 52, to receive a complementary abutment or transverse rib 53 formed on an auxiliary nose cap 54. This nose cap is threaded onto the nose and spindle 19 and provides a convenient and effective means for connecting this spindle to the power transmitting mechanism.

An idler roller 56 is rotatably mounted in bearings 57 and 58 at one side of the primary roller 41 to engage the latter. The bearings 57 and 58 are disposed in suitable recesses 59 and 61 formed in the casing 39, the recess 61 being closed by a removable cover 62. A lay shaft 63 is disposed preferably at the opposite side of the primary driving roller 41 and carries a driven roller 64 arranged to engage the driving roller 41 and also a secondary driving roller 66. A resilient annulus or ring 65 is disposed about the driven roller 64 and the idler roller 56 and is of such a size as to have its inner periphery firmly engage the rollers 56 and 64 thus to tend to press these rollers against the interposed driving roller 41 so as to ensure good adhesion between the engaging surfaces of these rollers. This lay shaft is rotatably mounted in bearings 67, 68 mounted respectively in recesses or chambers 69, 70, each of which is closed by a removable cover 71 and 72 respectively. An idler roller 73 is rotatably mounted in bearings 74, 76 in position to engage the secondary driving roller 66. Bearings 74 and 76 are mounted in chambers 77, 78 formed in the casing 39, the chamber 78 being closed by a removable cover 79.

A driven shaft 81 is arranged with its axis in alignment with the axis of the driving shaft 42 and carries a secondary driven roller 82 disposed in engagement with the secondary driving roller 66. A resilient annulus or ring 85 is disposed about and in snug engagement with the peripheries of the idler roller 73 and driven roller 82 so as to press these rollers against the secondary roller 66 and thus to ensure good adhesion between the contacting surfaces of these members. One end of the shaft 81 is mounted in the ball bearing 83 while at the opposite side of the roller 82 the shaft is tapered and is rotatably supported in a tapered bearing 84. The outer end or nose of the shaft 81 is threaded, as indicated at 86, to receive the face plate 27.

The manner in which the various driving, driven and idler rollers function is shown more clearly in Fig. 4 in which for the purposes of illustration the central roller may be regarded as the primary driving roll 41, while one of the smaller rollers represents the driven roll 64, and the other small roller indicates the idler roller 56. The ring 65 is also illustrated as in engagement with the rollers 64 and 56. These rollers as well as the ring 65 preferably are formed with hard ground steel surfaces which roll upon each other and which are pressed together with forces depending largely upon the position of the ring 65. As the roller 41 is operated in a counterclockwise direction, as indicated by the arrow, it tends to rotate the rollers 56 and 64 in a clockwise direction. The axes of the rollers 56, 41, 64 and of the ring preferably are arranged in substantially the same plane and as long as power is transmitted at a uniform rate and for relatively light loads, this relationship is preserved. However, as soon as the driving roller 41 tends to slip due to lack of adhesion with the driven roller 64 this results in an increase in speed of the roller 56 which, due to its engagement with the ring 65, moves the latter upwardly, thereby moving the center or axis of the ring 65 out of alignment with the axes of the rollers and thus causing the ring to assume some position such as that shown in the dotted lines. It will be apparent that when the ring is in this position it will exert a greater pressure on the outer rollers 56 and 64 and produce greater adhesion between these rollers and the driving roller 41. In this way the ring 65 functions to counteract any tendency for slipping between the various rollers.

It will be understood that as the ring exerts a greater binding force on the rollers 56 and 64 the latter must yield or move to some relatively slight extent in order to obtain the increased adhesion. In some cases this is provided for by mounting one of the rollers in movable bearings, usually the idler roller, while in other cases the bearings themselves may be sufficiently compressible to allow this slight change, or the roller may be the compressible or slightly yieldable member. As these features of this apparatus are well understood in the art, they are only briefly referred to here.

Another arrangement of driving, driven and idler rollers is shown diagrammatically in Fig. 5. In this view the driving roller 91 is arranged directly to engage the resilient ring 92 which latter also engages the idler roller 93, the driven roller 94 being disposed between the idler and the driving roller. While it is contemplated that in some instances an arrangement of rollers such as that shown in Fig. 5 may be embodied in an apparatus of the class described, it is preferred to use the arrangement shown in Figs. 1 and 4 for reasons which will presently appear.

As previously pointed out, there are many classes of work commonly performed on lathes, boring mills, milling machines and related apparatus in which a slight variation in the operating speed is detrimental to the work produced. Where such precision and accuracy is required the arrangement of rollers shown in Figs. 1 to 4 of the drawings should be employed. For instance, assume that power is being transmitted through apparatus such as that shown in Fig. 5 and that for some reason there is a slight tendency for the driving roller 91 to slip on the driven roller 94. In the practically infinitesimal interval of time during which any tendency to slip first exhibits itself, the factors of adhesion between each pair of contacting rollers and also between the rollers and the ring are substantially the same. To correct this condition so as to prevent slipping, it is necessary for the ring to move (clockwise as shown) faster than the idler 93. The resulting increase in speed of the ring tends to accelerate the idler in the same proportion, the latter slipping on the driven roller momentarily. When this occurs the axis of the ring does not change its position promptly and consequently the requisite adhesion for the greater loads is not provided without momentary delay. This delay is usually sufficient to cause damage to work being done. While the effect of this delayed action of the ring on the low speed member of a speed reduction set is relatively slight, it is nevertheless objectionable for apparatus of the class described. On speed increaser units, however, and particularly on such units as are intended for use on lathes and related apparatus, this delayed action produces a much more pronounced and decidedly objectionable affect on the high speed member, which on a lathe operates the face plate and rotates the stock.

These undesirable results are avoided by employing apparatus of the type shown in Figs. 1 to 4, for as the driving roller 41 tends to slip on the driven roller 64 it likewise tends to increase the speed of the idler roller 56 which engages the ring 65 and carries the latter upwardly, being assisted in this action by the fact that the ring is now in engagement with the driven roller which can not be moved as easily as the idler roller 56. The idler roller therefore tends to move or to swing the ring about its point of engagement with the driven roller (which is temporarily retarded) as a pivot. This action is practically instantaneous with the result that the ring is moved to a position to prevent slipping before any detrimental change of speed of the driven roller can take place. This arrangement is therefore much more sensitive than that shown in Fig. 5 and its use avoids objectionable results of the type just pointed out.

Furthermore, it will be seen that the productive capacity and utility of a machine of the class described may be increased by the use of a speed change unit, such as the illustrated speed increaser unit and that this may be accomplished without the use of tooth gearing, and yet with the assurance of a smooth, even flow of power under various operating conditions. For instance, a lathe equipped with such a speed increaser is capable of rotating a piece of stock at 3000 or more R. P. M., as desired, without producing the objectionable variations in speed, which have heretofore made it impractical to attempt to operate at this relatively high speed. It thus becomes possible to obtain the maximum cutting value from the better grade of cutting tools and in general to increase the operating efficiency of machines of this class. As the speed change unit is readily detachable, the usual range of lower operating speeds becomes available upon removal of the unit, in which event the face plate is attached directly to the spindle in the usual manner.

It should be understood that the present disclosure is for the purpose of illustration only and that this invention includes all modifications and equivalents which fall within the scope of the appended claims.

I claim:

1. The combination of a machine of the class described having a spindle and a speed-change power transmitting unit, said unit comprising a housing, two sets of rolls within and supported by the housing, each of said sets of rolls having an intermediate driving roll, a driven roll in frictional engagement with the driving roll, an idler roll opposite to the driven roll and in frictional engagement with the driving roll and an annular ring associated with each set of rolls and frictionally engaging the corresponding driven roll and idler roll, the driving roll of the first of said sets being mounted in axial alignment with said spindle, and a shaft supporting said last-named driving roll and detachably connecting the same to the spindle, an aligned shaft supporting the driven roll of said second set, a common shaft supporting the driven roll of the first set and the driving roll of the second set, each of said annular rings being normally in symmetric relation with the corresponding driving roll of its set, but being movable into a slightly unsymmetric relation thereto in response to tendency toward slippage between the driving and driven rolls of the set whereby the frictional engagement of said rolls is automatically increased, and whereby a frictional drive adapted effectively to operate at high speeds is afforded.

2. The combination with a machine of the class described comprising axially aligned driving and driven shaft sections, of a speed increaser unit interposed therebetween, said unit comprising a plurality of sets of toothless friction rollers, a lay shaft extending between the rollers of each set, the lay shaft being offset to one side of said aligned shaft sections, one of said sets of rollers comprising a driving roller connected to said driving shaft section, an idler on one side of this driving roller and in frictional contact therewith, a driven roller on the other side of this driving roller and in frictional contact therewith, this driven roller being carried by the lay shaft, these rollers having their axes disposed normally in a single plane but movable out of this plane for increasing adhesion, an annulus having a smooth continuous and uninterrupted inner surface in frictional contact with idler and driven rollers of this set, this annulus being automatically movable transversely of the axes of these rollers for forcing the latter together to increase the adhesion therebetween, the next set of rollers comprising a driving roller carried by said lay shaft, an idler roller and a driven roller disposed on opposite sides of the latter driving roller and in frictional contact therewith, the latter driven roller being connected to said driven shaft section, the rollers of this set also having their axes disposed normally in a single plane but movable out of this plane for increasing adhesion, and an annulus having a smooth continuous and uninterrupted inner surface in frictional contact with the idler and driven rollers of this set, this annulus also being automatically movable transversely of the axes of the rollers of the latter set for increasing the adhesion therebetween, whereby a smooth continuous flow of power may be transmitted positively between said aligned driving and driven shaft sections without the use of toothed gears.

Signed by me at Boston, Massachusetts, this 22nd day of September, 1930.

ERNEST R. LLEWELLYN.